No. 635,508. Patented Oct. 24, 1899.
E. E. PEQUEGNAT.
EYEGLASSES.
(Application filed June 27, 1899.)
(No Model.)
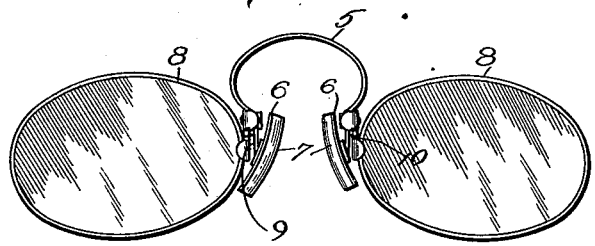
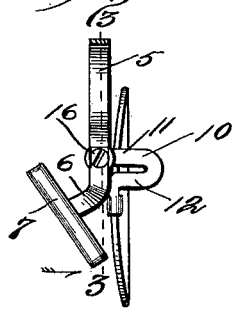 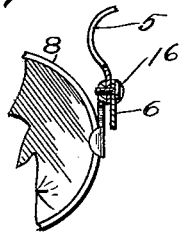
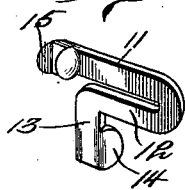
Witnesses
Emile E. Pequegnat, Inventor.
By his Attorneys,

# UNITED STATES PATENT OFFICE.

EMILE E. PEQUEGNAT, OF ST. LOUIS, MICHIGAN.

EYEGLASSES.

SPECIFICATION forming part of Letters Patent No. 635,508, dated October 24, 1899.

Application filed June 27, 1899. Serial No. 722,058. (No model.)

*To all whom it may concern:*

Be it known that I, EMILE E. PEQUEGNAT, a citizen of the United States, residing at St. Louis, in the county of Gratiot and State of Michigan, have invented new and useful Eyeglasses, of which the following is a specification.

My invention relates to improvements in eyeglasses adapted to either the framed or rimless type; and the object in view is to provide an improved construction by which the lenses and pad-plates may be connected with the bow-spring for the purpose of adjusting the lenses edgewise to the bow-spring without disturbing the relation between the pad-plates and the bow-spring, whereby the lenses may be shifted relatively to each other to bring the focal axes of said lenses in alinement with the pupils and axes of the eyes, thus obtaining accuracy in the adjustment of the eyeglasses by the simple operation of bending the parts.

To the attainment of these ends the invention consists of a pair of double-armed plates, each consisting of a single piece of pliable or bendable metal, one arm of each plate having a flanged head forming the stud for the reception of the bow-spring and a pad-plate and the other arm of said bendable plate provided with a depending shank which is disposed at right angles to the space between the arms of said plate, said shank having lips adapted to be fastened to a lens-frame or to the lens. Each double-armed plate thus has its respective ends adapted for the attachment of a lens or lens-frame and for securing the bow-spring and the pad-plate by the employment of a single screw, and one arm or the shank of the pliable plate may be bent laterally with respect to the other arm for the purpose of bringing the lenses closer together or farther apart.

In the drawings, Figure 1 is an elevation of a pair of eyeglasses having its several parts united together by bendable plates embodying my invention. Fig. 2 is a vertical cross-section through the bow-spring, showing a pad-plate, a bendable plate, and a lens in elevation. Fig. 3 is a vertical sectional elevation at right angles to the plane of section of Fig. 2 and on the line 3 3 of said Fig. 2. Fig. 4 is an enlarged detailed perspective view of one of the double-armed bendable plates detached from the eyeglasses.

The same numerals of reference are used to indicate like and corresponding parts in each of the several figures of the drawings.

5 designates an ordinary bow-spring. 6 are the pad-plates, each having a pad 7 of any approved material, and 8 are the lens-frames. For connecting the lenses of rimless eyeglasses or the lens-frames of framed eyeglasses to the ends of the bow-spring I employ the double-armed bendable plates 9 10, each of which has one end attached to the lens or lens-frame, while its other end is fastened to one end of the bow-spring and to the pad-plate by a single screw, as 16. The bendable plates provide for the edgewise adjustment of the lenses or lens-frames relative to each other and the bow-spring without disturbing the positions of the pad-plates, which are attached to the ends of the bow-spring and the heads of the bendable plates, whereby the lenses may be shifted to bring the focal axes thereof in alinement with the pupils and axes of the eyes subsequent to the adadjustment of the pad-plates to the nose of the wearer.

Each bendable plate 9 or 10 is struck up in a single piece of metal in substantially the form shown by Fig. 4 of the drawings, and this plate consists of a long arm 11 and a short arm 12, said plates being joined at one end by an integral bight or part of the metal, so as to bring them in the same plane and in edgewise relation one to the other, a narrow space intervening between and separating the arms. The short lower arm 12 of the bendable plate terminates at its free end in a depending shank 13, which is disposed in the plane of the arm 12 and lies at right angles to the length of said arms, forming the plate proper. At its lower free extremity this depending shank is formed with the lips 14, which are integral with the shank and are adapted to be bent at right angles to the edges thereof, so as to form a clip which may embrace the lens-frame 8, as shown by Figs. 1 to 3, inclusive, whereby the free end of the shank 13 may be attached to the lens-frame by a solder joint or its equivalent, thus leaving the shank 13 free from connection with the lens or lens-frame, so as to be bent with respect thereto in adjusting one lens-frame in relation to the other. It is evident that the clip at the free end of the shank on the lower arm of the bendable plate may be made to embrace the lateral faces of a lens in a rimless eyeglass, thus providing for the direct attachment of the lens to an arm of the bendable plate. The other long arm 11 of the bendable plate is provided at its extremity with a thickened portion and with offset flanges, the whole forming the equivalent for the stud employed in ordinary eyeglasses. The thickened and flanged end of the long arm 11 of the plate forms a head in which may be fitted one end of the bow-spring 5, and this flanged head is also adapted to receive one end of the pad-plate, which is adapted to overlap the end of the bow-spring and to be confined within said flanged head along with the bow-spring. A screw 16 passes through the overlapping ends of the bow-spring and the pad-plate, said screw being received in a tapped or threaded opening of the thickened portion of the head 15, as clearly shown by Fig. 3, for the purpose of uniting the bendable plate, the bow-spring, and the pad-plate by a single fastener.

From the foregoing description it will be seen that the lenses are united to the pad-plates and the bow-spring by bendable double-armed plates which, as shown by Fig. 2, are adapted to project in front of a plane which bisects the lenses, thereby disposing the bendable plates in positions where they will not engage or touch the face of the wearer. Either plate 9 or 10 may have one or the other of its arms or the shank bent laterally by a suitable implement in the hands of the optician for the purpose of bringing the lenses closer together or setting them farther apart in order that the focal axes of the lenses may aline with the pupils and the axes of the eyes, thus securing accuracy in the adjustment of the eyeglasses. The improved plate is extremely simple and durable in construction, and it may be manufactured at a very low cost, because it is made or stuck up in a single piece of pliable metal by properly-fashioned dies. The improved plate provides for the attachment of the lens or lens-frame to one arm and enables the bow-spring and a pad-plate to be fastened by a single screw to the other arm of said bendable plate, thus meeting the practical requirements for a device of this character adapted for use universally in connection with framed or rimless eyeglasses.

Changes may be made in the form and proportion of some of the parts, while their essential features are retained and the spirit of the invention embodied. Hence I do not desire to be limited to the precise form of all the parts as shown, reserving the right to vary therefrom.

Having thus described the invention, what I claim is—

The combination with lenses, of the pliable or bendable plates, each having a long arm and a short arm arranged in a common plane and spaced edgewise with relation one to the other, the short arm having at its unconfined end a right-angularly-disposed shank which is made fast with one lens at a point below the short arm, a bow-spring fastened to the long arms of said plates, and pad-plates also secured to said long arms of the plates, substantially as described.

In testimony that I claim the foregoing as my own I have hereto affixed my signature in the presence of two witnesses.

EMILE E. PEQUEGNAT.

Witnesses:
E. J. HOFSTITTER,
C. H. BORD.